(12) United States Patent
Ziemkowski et al.

(10) Patent No.: US 10,007,026 B2
(45) Date of Patent: Jun. 26, 2018

(54) LASER SENSOR WITH FLOURESCENT LOADED TRANSPARENT PLASTIC

(71) Applicant: Z-Image, LLC, Firestone, CO (US)

(72) Inventors: Theodore Bruce Ziemkowski, Firestone, CO (US); John Bonvallet, Boulder, CO (US); Devon Clark, Louisville, CO (US); Peeraya Nilwong, Firestone, CO (US); Frank Kennedy, Longmont, CO (US); Patrick Simons, Longmont, CO (US)

( * ) Notice: Subject to any disclaimer, the term of this patent is extended or adjusted under 35 U.S.C. 154(b) by 0 days. days.

(21) Appl. No.: 14/509,998

(22) Filed: Oct. 8, 2014

(65) Prior Publication Data

US 2016/0370496 A1  Dec. 22, 2016

(51) Int. Cl.
*G01V 13/00* (2006.01)

(52) U.S. Cl.
CPC .................... *G01V 13/00* (2013.01)

(58) Field of Classification Search
CPC ............... G01V 8/18; G01V 13/00
See application file for complete search history.

(56) References Cited

U.S. PATENT DOCUMENTS

| 2001/0022342 A1* | 9/2001 | Wirthlin | G01C 9/06 250/229 |
| 2003/0127583 A1* | 7/2003 | Bechtel | B60R 1/088 250/216 |
| 2016/0170084 A1* | 6/2016 | Ziemkowski | G01J 1/58 250/201.1 |

\* cited by examiner

*Primary Examiner* — David Porta
*Assistant Examiner* — Faye Boosalis
(74) *Attorney, Agent, or Firm* — Krajec Patent Offices, LLC; Russell S. Krajec

(57) ABSTRACT

A sensor for a laser may contain an at least partially transparent plastic with a fluorescent material that receives laser light at one frequency and creates light inside the transparent plastic with a second, different frequency. The light at the second frequency may travel through the plastic to an electronic sensor mounted against the transparent plastic. The sensor may be several feet in length or longer and still detect a single impinging Class I or Class II laser beam. In systems where the position of the laser may be known, a set of linear gain coefficients may be determined to calibrate the electronic sensor, as the signal strength of a received signal may decay with the distance from the electronic sensor to the location where the laser beam impinges the plastic element.

17 Claims, 12 Drawing Sheets

FIG. 3 CROSS-SECTION OF SENSOR WITH DIFFUSER

FIG. 10    1000
METHOD FOR CALIBRATION

1100 Method for Normal Operation

LASER SENSOR WITH FLOURESCENT LOADED TRANSPARENT PLASTIC

BACKGROUND

Lasers have many uses, including detecting the presence or absence of objects by detecting when a laser beam is received by a sensor. A laser transmitter may send the laser beam across a void to a sensor. When the laser beam is received by the sensor, there is no opaque object in between. When the laser beam is not received by the sensor, an object may be present. Another reason why the laser beam may not be received may be that the laser or its sensor have been misaligned or maladjusted.

A fixed laser beam may sense the presence or absence of an object using a straight beam of light. Such a sensor only detects the presence or absence along a line from the laser source to the sensor. A scanning or moving laser may be deployed to scan a planar or three dimensional area, provided that a sensor is able to detect the laser beam in the areas being scanned.

The alignment and calibration of a laser transmitter and receiver can be a tedious operation in some cases. In some hostile environments, the lasers or their sensors may be bumped, moved, or otherwise may be misaligned, which may inadvertently cause the laser to not be received. When such a condition is found, a technician may be dispatched to realign and test the system, then place it back in service.

SUMMARY

A sensor for a laser may contain an at least partially transparent plastic with a fluorescent material that receives laser light at one frequency and creates light inside the transparent plastic with a second, different frequency. The light at the second frequency may travel through the plastic to an electronic sensor mounted against the transparent plastic. The sensor may be several feet in length or longer and still detect a single impinging laser beam. In systems where the position of the laser may be known, a set of linear gain coefficients may be determined to calibrate the electronic sensor, as the signal strength of a received signal may decay with the distance from the electronic sensor to the location where the laser beam impinges the plastic element.

A two dimensional scanning laser system may automatically detect a laser, then align and calibrate itself to scan over the sensor area. The system may have a laser with a controller that may cause the laser to be directed over two dimensions, as well as a sensor apparatus. The laser may be controlled with a mirror system that may pivot in two directions, thus allowing the laser to be scanned over a two dimensional area. The sensor may be a point sensor, where the laser may be positioned in a constant direction, as well as a larger area sensor where the laser may be moved across the sensor area to detect objects in a two or three dimensional space. An alignment and calibration sequence may cause the laser to scan across its operational area and detect the location of one or more sensors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
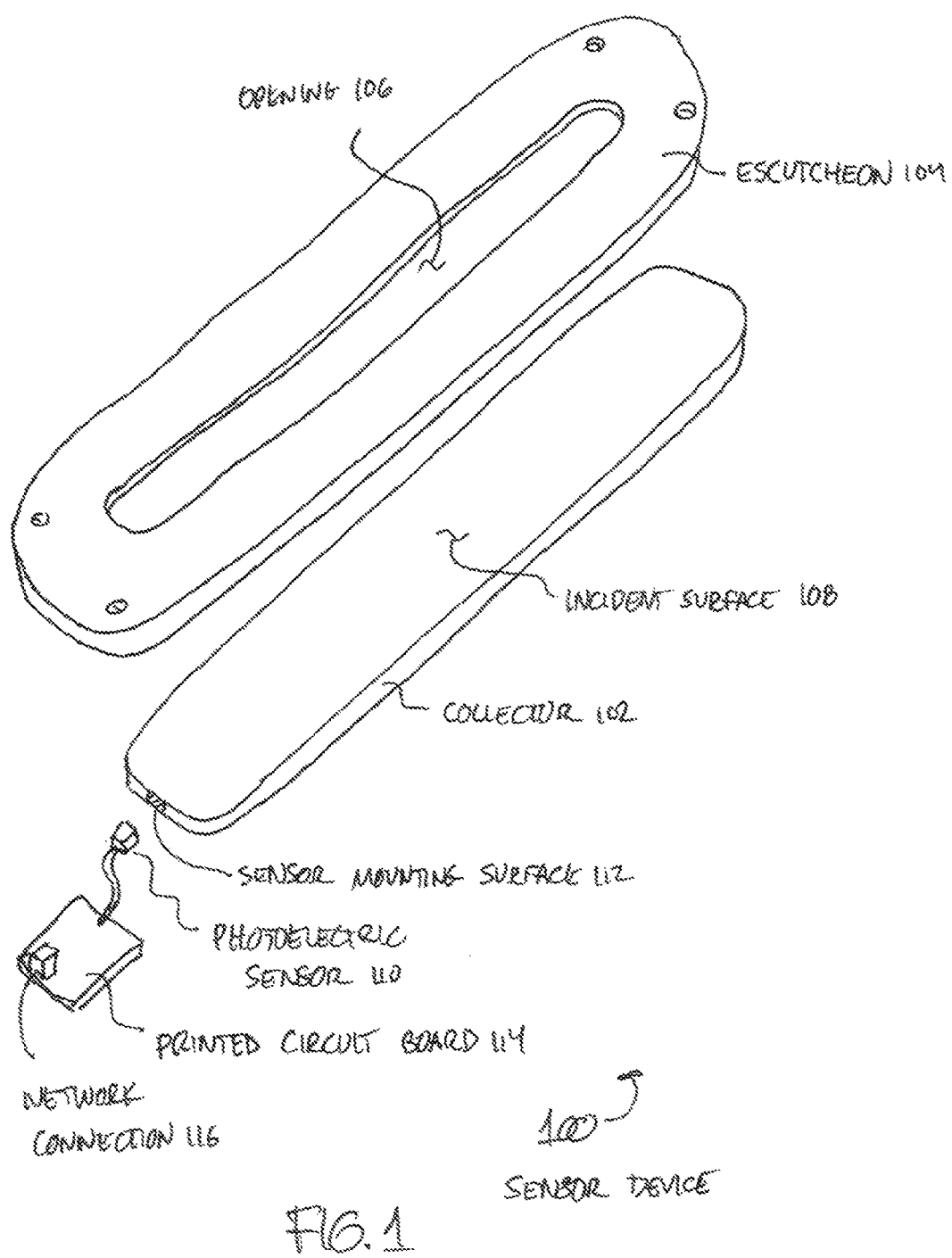
FIG. 1 is a diagram illustration of an embodiment showing an exploded view of a sensor device.

Laser Sensor with Fluorescent Loaded Transparent Plastic

A laser sensor may incorporate a fluorescent material in a transparent plastic component. The fluorescent material may be excited by an impinging laser beam, then create a different wavelength of light inside of the plastic component. The light may then propagate within the plastic component where it can be sensed using an electronic sensor.

The laser sensor may operate by using the plastic component as a light pipe to conduct light from a location where a laser beam impinges the component to a sensor that may be located on an edge of the plastic component. The plastic component may be a planar sheet plastic material, which may be curved, bent, molded, or shaped in various forms, or may be used as a flat sheet in a sensor.

The fluorescent material in the plastic component may cause a change in the color or frequency of the impinging light. The laser beam may be green, red, or other color, and the fluorescent material may become excited by the laser light, then emit orange, pink, blue, green, or other color light. The second frequency may be selected by the fluorescent doping of the plastic, and may be selected to correspond with an electronic sensor, which may be a photodiode, photoresistor, or other type of light sensor.

The laser sensor may be fabricated from a fluorescent doped plastic material, an electronic sensor, and various mounting or protecting hardware. The sensor may include a protective transparent sheet, which may be frosted in some cases. The electronic sensor may have various electronic circuitry that may provide other functionality, such as gain adjustment.

The laser sensor may be configured in many shapes and sizes. Such a sensor may be small, such as 0.25 in diameter or smaller, or may be large, such as versions that are several feet or more in size. One version of the sensor may be elongated to detect a laser beam that may move in a linear motion may be sensed along the entire path of motion.

Laser Alignment and Calibration System for Scanning Lasers

A laser alignment system may have a one or two dimensional directional control that may be used to locate and align to a sensor and calibrate the signal strength at the sensor. The system may scan a laser beam over its operational area to detect the presence and location of sensors in the operational area. The system may also calibrate itself to achieve a consistent signal level when a laser impinges a sensor, regardless of the location of the impingement.

The laser alignment system may use a laser transmitter that may be outfitted with a mirror or set of mirrors that may rotate in one or two dimensions. The rotation may be controlled to point the laser beam in various locations, all of which may be under programmatic control. A controller may cause the laser beam to move anywhere within an operational area, which may be defined by a cone, pyramid, or other volume in which the laser may be oriented.

A controller may perform an alignment and calibration sequence in several steps. The controller may cause the laser to scan across the operational area to identify any sensors within the operational area. The controller may be connected to the sensors and may receive signals from the sensors. As each sensor is identified, the controller may record the position of the laser beam, thereby creating a map of the sensors.

The controller may search for sensors in multiple passes. In a first pass, the general locations of various sensors may be identified. In a second pass, a finer grained location may be determined. In such a system, a first pass may be performed by scanning quickly and with wider gaps between scan lines, while the second pass may be slower and with narrower gaps between scan lines, but may be performed only in the areas where a sensor was detected. Such systems may be useful when sensors are oddly shaped or when higher precision is desired, for example.

A calibration operation may be performed by comparing the measured signal strength from a sensor at one or many locations across the sensor. The calibration operation may include various mechanisms to normalize or calibrate the incoming signal to detect the presence or absence of a laser on the sensor. In some cases, the laser may be operated in a lower power mode or pulsed to generate a detected signal level closer to a predefined threshold.

Some sensors may generate different signal strength based on where the laser impinges the sensor. In such cases, the signal strength may be noted for different locations across the sensor, and a mathematical function may be computed to detect an offset or gain that may be applied at various locations. Such functions may be linear or nonlinear.

Throughout this specification and claims, a laser is used as an exemplary light source that may be sensed using a sensor. In some cases, the light source may be a focused light source, light beam, collimated or non-collimated light source, laser, or other source of light.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration showing an exploded view of an embodiment 100 of a sensor. The sensor is illustrated in perspective view and shows some of the components of the sensor. Embodiment 100 is not to scale.

A collector 102 may be a sheet material that is translucent plastic with a fluorescent doping or additive. The fluorescent material may be excited by an incident laser and create light internal to the collector that is a different frequency than the laser. The light from the fluorescent material may remain largely trapped inside the collector 102 and may be sensed by a photoelectric sensor 110 that may collect the light through a sensor mounting surface 112.

The laser light may impinge the sensor through an incident surface 108, cause the fluorescent material to be excited, which generates a second frequency of light. The second frequency of light may propagate through the collector 102 to the photoelectric sensor 110. The photoelectric sensor 110 may be connected to a printed circuit board 114 and transmit a signal through a network connection 116.

The light generated by the fluorescent material may be a color or frequency that more closely matches the photoelectric sensor 110 than the incident laser beam. In some cases, the laser light frequency may be outside the detectability range of the photoelectric sensor 110 or may be only marginally detectable by the photoelectric sensor 110. By converting the incoming laser light at one frequency to light of a second frequency by the fluorescent material, the sensor may have more dynamic range and have improved sensitivity to light frequencies that were previously difficult to sense. Such a system may allow for a different set of photoelectric sensors to be used in sensing lasers that were previously not applicable.

The fluorescent material may be used to convert incoming red, green, blue, or other color laser light to orange, yellow, red, pink, green, blue, or other light. In some cases, the laser light or other light source may be invisible infrared or ultraviolet light.

An escutcheon 104 may be an outer cover that may serve as a decorative or protective exterior element. In some cases, the escutcheon 104 may serve as a mounting mechanism. The escutcheon 104 may have an opening 106 through which a laser may pass and impinge on the incident surface 108 of the collector 102.

The printed circuit board 114 may include various circuitry in different designs. In one design, the printed circuit board 114 may have a controller that may control the operations of a steerable and controllable laser. In another design, the printed circuit board 114 may contain circuitry that converts an analog signal from the photoelectric sensor 110 to a digital output that may be communicated across a network. Such a design may also include a controller that may communicate using a network protocol, such as TCP/IP or other communications protocol. Such systems may include a controller that responds to queries in a pull-type communication as well as a controller that transmits changes in detected levels in a push-type communication.

In some cases, the printed circuit board 114 may produce an analog electrical signal that may be further sensed and processed.

Figure 2:
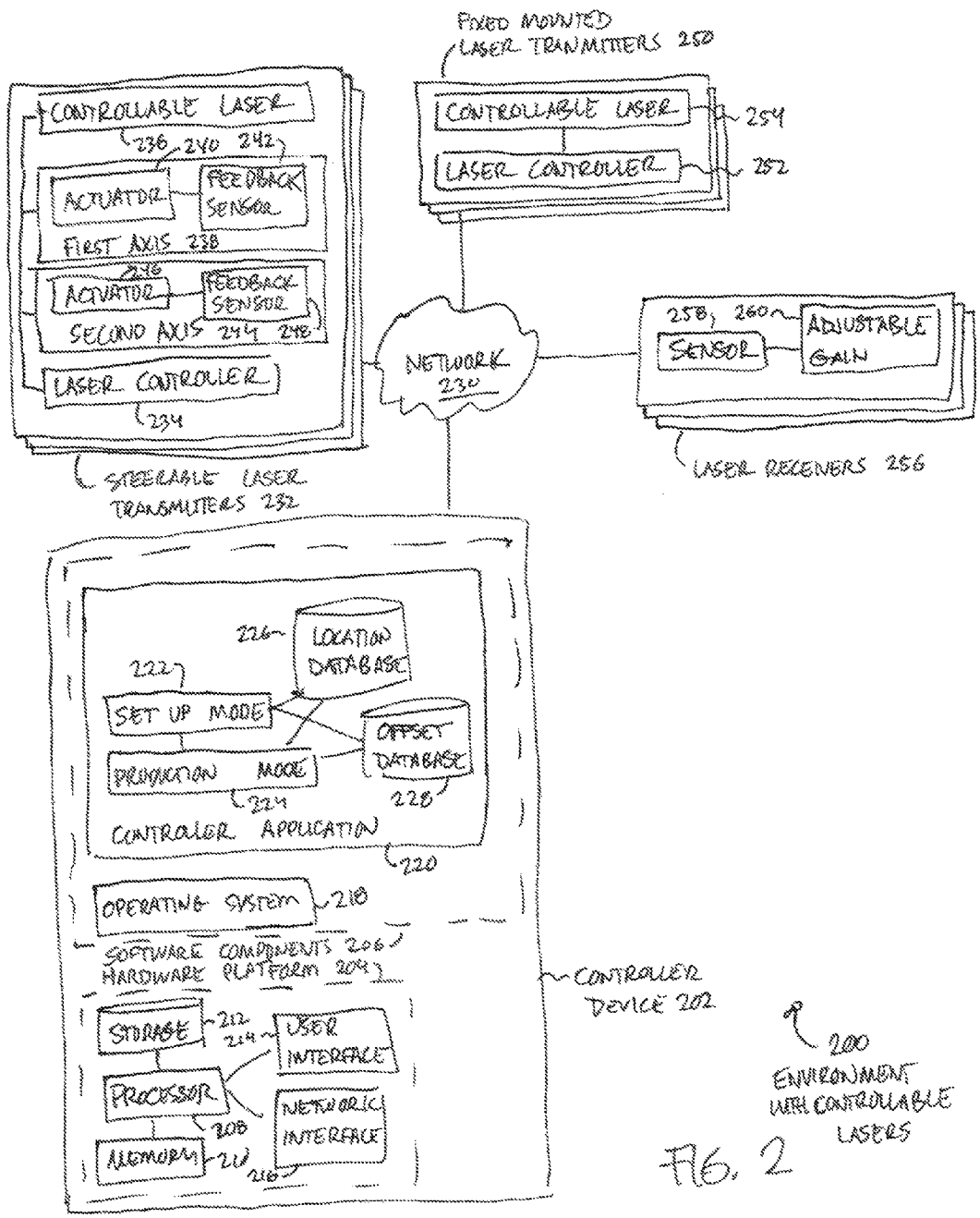
FIG. 2 is a diagram illustration of an embodiment showing a network environment with controllable and steerable lasers and sensors.

FIG. 2 is a diagram of an embodiment 200 showing components that may control and sense laser beams. The components are illustrated in an architecture that may have a central controller that may control several different laser and sensor combinations. One such example of a system may be a game system where the lasers may be used as obstacles in a maze. A figure presented later in this specification may illustrate a second architecture of a system that has a direct connection between a laser and a sensor, as opposed to the networked version illustrated in embodiment 200.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A controller application 220 may control the operations of various lasers and sensors. The controller application 220 may setup and calibrate the lasers and sensors using a setup mode 222, then transition to an operational or production mode 224 after calibration is complete.

The setup mode 222 may operate in two different phases. In a first phase, a steerable laser system may scan its operational area to detect the location of a sensor within its operational area. Once the location is determined, a calibration phase may set the power level, sensor sensitivity, or make other calibrations so that the laser's presence or absence may be detected with a predefined sensitivity.

The setup mode 222 may generate a set of locations in a steerable laser's operational area where a sensor exists. These locations may be stored in a location database 226. When the setup mode 222 performs calibrations, the offsets or calibration constants may be stored in an offset database 228.

A network 230 may connect the controller device 202 to various other components, including steerable laser transmitters 232, fixed mounted laser transmitters 250, and laser sensors or receivers 256. The network 230 may be any mechanism by which the various devices may communicate. In some cases, the network 230 may be direct, hardwired connections between the controller device 202 and the various other components. In other cases, the network 230 may be an Ethernet or other shared resource for multiple devices to communicate.

The steerable laser transmitters 232 may have a laser controller 234 that may take commands issued from the controller application 220 and operate a controllable laser 236, as well as a first axis 238 and second axis 234.

The controllable laser 236 may be a laser that the laser controller 234 may turn on and off. In some cases, the controllable laser 236 may be controllable to be turned on and off or modulated with a high frequency, and such frequencies may be multiple hertz, kilohertz, megahertz, or other ranges. The laser output may be controllable in amplitude or overall power level. Then the laser is controllable in power level, frequency, or other ways, the laser output may be calibrated such that a receiving sensor may receive the laser beam above but near a decision threshold. The decision threshold may be the received level that is defined as the boundary between detecting the presence of the laser. When the received level is above the boundary, the laser is detected as being present. When the received level is below the boundary, the laser is detected as not being present.

The sensitivity of the sensing system may be a function of how much margin or offset is between the normally on signal level and the decision threshold. When the sensitivity is too high and the margin between the normal signal level is too small, a very slight interruption or degradation of the laser signal may cause the sensor to be tripped. In a game situation, the use of fog or other elements in a game system may cause the laser signal to be attenuated, and setting the sensitivity too high may have unintended tripped sensors.

When the sensitivity is too low and the margin between the normal signal level is too large, the laser may be partially interrupted without causing the sensor to trip. Such a setting may not detect properly when the laser emits some spray or be partially diffused, as the main part of the laser beam may be interrupted but the spray may still transmit enough signal not to trip the sensor.

The first axis 238 and second axis 244 may be controllable axes that may direct the laser beam along two different arcs. In a typical deployment, a mirror may be mounted on a two dimensional rotating gimbal with each axis being separately controlled. The first axis 238 may have an actuator 240 and a feedback sensor 242, and the second axis 244 may have an actuator 246 and a feedback sensor 248.

The first axis 238 and second axis 244 may be controllable by the laser controller 234 to move the laser to an input 'location', which may be defined by a position of the first axis and a position of the second axis. The location may be captured by the respective feedback sensors 242 and 248. The actuators 240 and 246 may be stepper motors, servo motors, or some other type of actuator. The feedback sensors 242 and 248 may be any type of linear or angular distance transducer.

The laser controller 234 may be capable of communicating with the controller device 202 over the network 230. The controller device 202 may be able to send commands to the laser controller 234 to turn on the laser, set the laser's power and other attributes, as well as cause the laser to be pointed in a given location. The laser controller 234 may further be capable of two way communication, where the controller device 202 may be able to query the laser controller 234 about status, identification, and other information, and the laser controller 234 may be capable of responding to such queries.

A fixed mounted laser transmitter 250 may be controlled by the controller device 202. The fixed mounted laser transmitters 250 may be similar to the steerable laser transmitters 232, but where the direction of the laser may be manually configured and may not be under programmatic control. A fixed mounted laser transmitter 250 may have a laser controller 252 along with a controllable laser 254. The capabilities of the controllable laser 254 may be similar to those described for the controllable laser 236, and the capabilities of the laser controller 252 may be similar to those described for the laser controller 234.

The laser receivers 256 may have a sensor 258 and an adjustable gain system 260. The sensor 258 may be similar to the sensor described in embodiment 100. the adjustable gain system 260 may be electronics or other circuitry that may be programmable or changeable to adjust the gain of the output when a laser impinges on the sensor 258.

Figure 3:
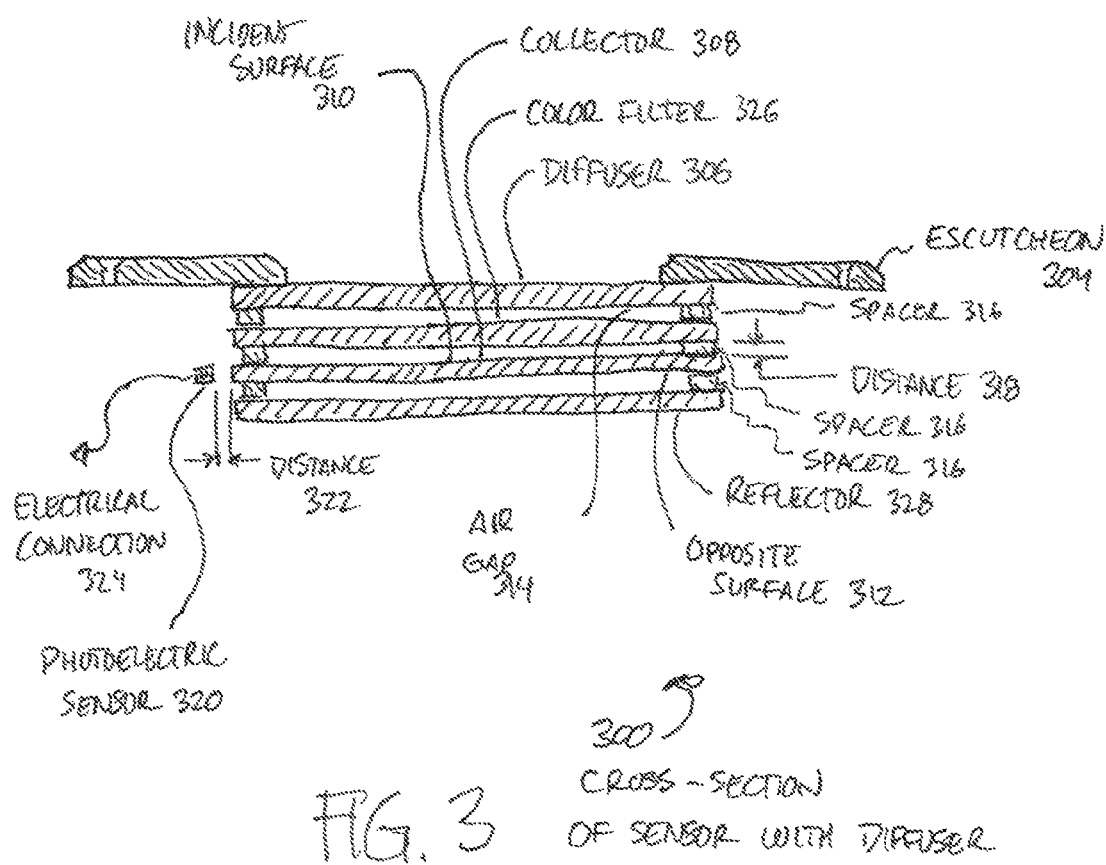
FIG. 3 is a diagram illustration of an embodiment showing a section view of a laser sensor.

FIG. 3 is a diagram illustration of an embodiment 300 showing a section view of a sensor with a diffuser. Embodiment 300 is not to scale.

The sensor 302 may have an escutcheon 304, a diffuser 306, and a collector 308. The escutcheon 304 may serve as a mounting device as well as an aesthetic and protective cover to the sensor 302. A color filter 326 may serve to filter incoming light, and a reflector 328 may help capture additional light that may have passed through the collector 308.

A diffuser 306 may be a translucent sheet material that may be frosted or have some other diffusing pattern. The diffuser 306 may scatter an incoming laser beam so that the scattered laser beam may impinge a wide area of the collector 308. In such cases, a larger amount of fluorescent material may be excited in the collector 308 than in embodiments where the diffuser 306 may not be present.

The diffuser 306 may further serve as a protective layer that may prevent damage to the collector 308 when the sensor is in service.

A color filter 326 may filter the incoming light to allow light within a predetermined color or set of frequencies to pass through the color filter 326 and illuminate the collector 308. The color filter 326 may pass colors or frequencies that may excite material in the collector 308 and may not pass light at other frequencies that may or may not excite the collector 308. In many cases, the color filter 326 may be selected to pass light at the same or similar colors or frequencies as the laser or other light source that is to be detected, while rejecting or not passing light at other colors or frequencies.

The color filter 326 may be useful when attempting to detect a light source with a known and predetermined color or frequency. One example may be to use a green color filter 326 to sense a green laser beam, and where the green color filter 326 may screen out ambient light. Such a filter may increase the sensor's detection when used in situations where ambient and other light sources are present.

The color filter 326 may be a sheet of translucent material that contains a colorant, such as a colored polycarbonate sheet. In some cases, the color filter 326 may be a film, coating, or other type of filter that may be applied to the diffuser 306, collector 308, or some other component.

The collector 308 may have an incident surface 310, which may be the surface through which a laser beam may impinge on the collector 308. An opposite surface 312 may be parallel to the incident surface 310. In many embodiments, the incident surface 310 and opposite surface 312 may be polished surfaces. The polished surfaces may serve to reflect the light internally generated by the excited fluorescent material and allow the light to propagate to a photoelectric sensor 320.

A reflector 328 may be placed behind the opposite surface 312. The reflector 328 may be a mirror or other material that may reflect back any light that may have passed through the collector 308. In some cases, the reflector 328 may increase the sensor's ability to gather low levels of light that may impinge the incident surface 310.

The collector 308 may be mounted with an air gap 314 between the diffuser 306 and the incident surface 310. The air gap 314 may prevent light from the collector 308 to propagate into the diffuser 306. The air gap 314 may be achieved by using mounting spacers 316 to create a distance 318. In many cases, the distance 318 may be as small as 0.050 in or smaller, although gaps or 1/16 in, 1/8 in, 1/4 in, 3/8 in, or larger may also be used. In some embodiments, some or all of the components of the sensor may be assembled without air gaps such as the air gap 314.

Embodiment 300 illustrates three sets of spacers 316, each providing a similar air gap 314 between the various components, such as the diffuser 306, color filter 326, collector 308, and reflector 328. In other embodiments, different sized spacers may be used between each of the various components. For example, a larger air gap may be provided between the diffuser 306 and the color filter 326, and a smaller air gap (or none at all) may be provided between the color filter 326 and the collector 308.

The photoelectric sensor 320 may also be mounted a distance 322 from the collector 308. In many cases, the distance 320 may be as small as 0.050 in or smaller, although gaps or 1/16 in, 1/8 in, 1/4 in, 3/8 in, or larger may also be used. In some cases, the photoelectric sensor 320 may be in contact with the collector 308. In still other cases, a sensing component of the photoelectric sensor 320 may be installed into a hole, recess, countersink, or other indentation into the collector 308.

In some cases, the photoelectric sensor 320 may be mounted with a clear or translucent bonding agent that may fuse, glue, pot, or otherwise connect the photoelectric sensor 320 with the collector 308.

The photoelectric sensor 320 may have an electrical connection 324 to a printed circuit board, network connection, controller, or other device not shown.

Figure 4:
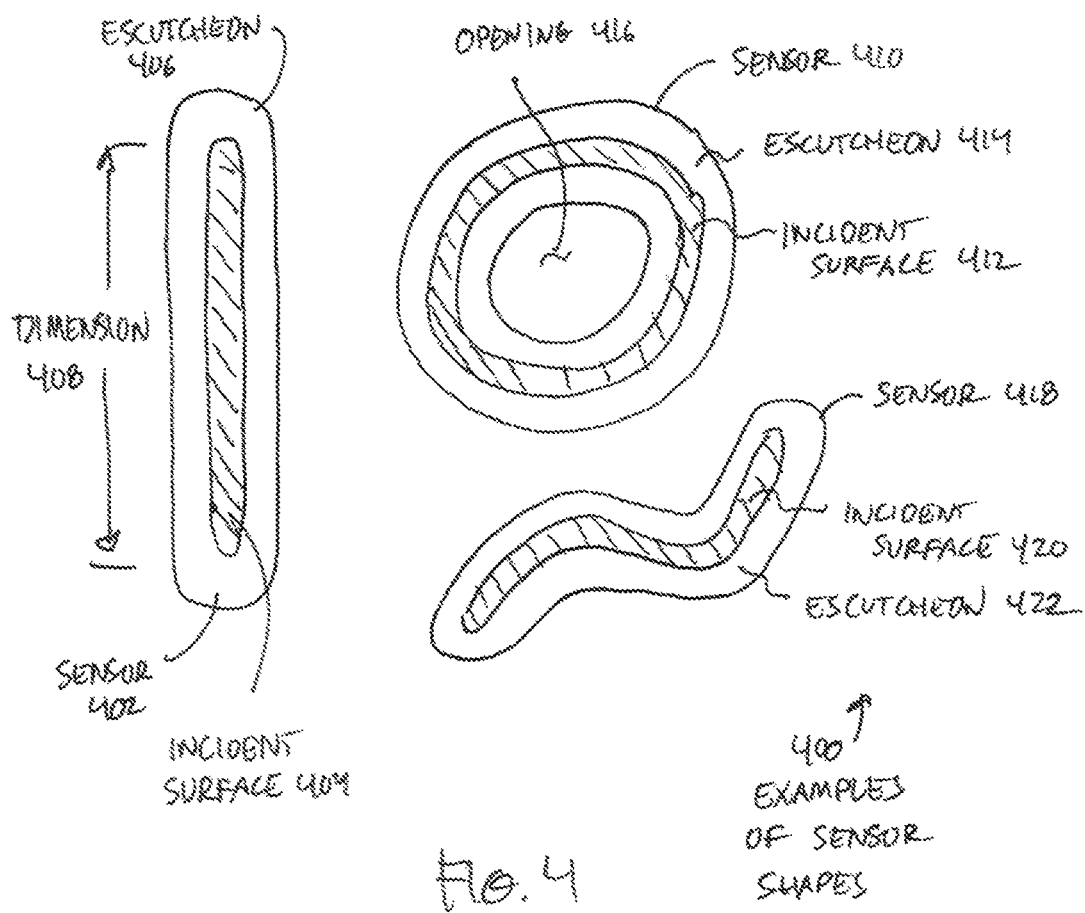
FIG. 4 is a diagram illustration of an embodiment showing a several examples of sensor shapes.

FIG. 4 is a diagram illustration of an embodiment 400 showing several samples of sensor shapes. Embodiment 400 is not to scale. The examples of shapes may illustrate sensors that may capture a laser beam that may be moved across different points of the sensor to form a movement path. Such a movement path may be used with a steerable laser transmitter to direct the laser along the path, all the while being able to determine that the laser is impinging on a collector and being able to detect when the laser beam is broken.

A sensor 402 may illustrate a long, thin sensor where a laser may traverse a straight line. The sensor 402 is illustrated with an incident surface 404 and an escutcheon 406. The sensor 402 may have a length 408 which may be any length. In some cases, the length 408 may be several inches, feet, yards, or more in length.

The length 408 may be 1 in, 2 in, 3 in, 4 in, 6 in, 8 in, 12 in, 24 in, 36 in, 48 in, or longer. The other example sensors in embodiment 400 may have similar sizes.

The sensor 410 may be a circular sensor that may have a center opening 416. The sensor 410 is illustrated with an incident surface 412 and an escutcheon 414. The sensor 410 may be used by having a laser beam traverse the circular path of the incident surface 412.

The sensor 418 may illustrate a sensor that has a winding path. An incident surface 420 is illustrated with an escutcheon 422. The sensor 418 may be used by having a laser traverse the path of the incident surface 412.

The sensors illustrated in embodiment 400 may be planar or may be formed, shaped, molded, or otherwise have three dimensional contours, including three dimensional contours in the various incident surfaces.

Figure 5:
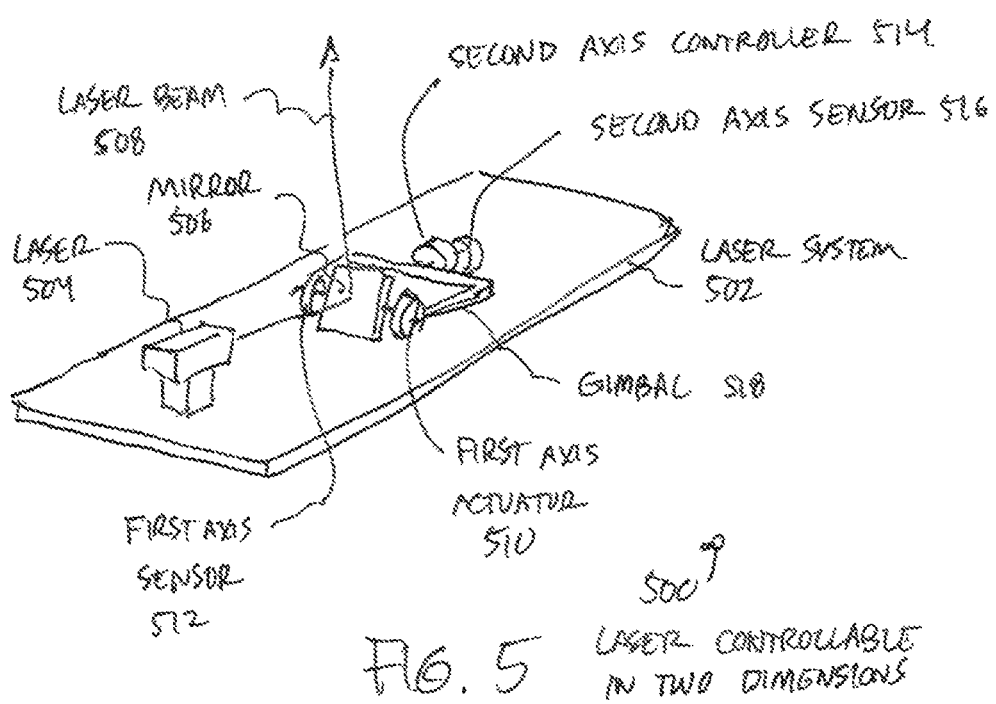
FIG. 5 is a diagram illustration of an embodiment showing a steerable laser that is controllable in two dimensions.

FIG. 5 is a diagram illustration of an embodiment 500 showing a laser controllable or steerable in two dimensions. Embodiment 500 is not shown to scale.

The laser system 502 may have a laser 504, which may be fixed mounted and may be directed at a mirror 506. The mirror 506 may be mounted on a two-axis gimbal 518, which may be moved and monitor by a first axis actuator 510 and a first axis sensor 512, as well as a second axis actuator 514 and a second axis sensor 516.

The steerable or controllable laser system 502 may have the capabilities described for the steerable laser transmitters 232 in embodiment 200, and may be merely one example of such a laser transmitter.

In some embodiments, a two-mirror system may be used. A two-mirror may have one mirror that can be moved in one dimension while a second mirror is moved in a different dimension. Such a system may be controlled in a similar manner as the gimbal design illustrated in embodiment 500. Other controllable or steerable light sources may also be used.

Figure 6:
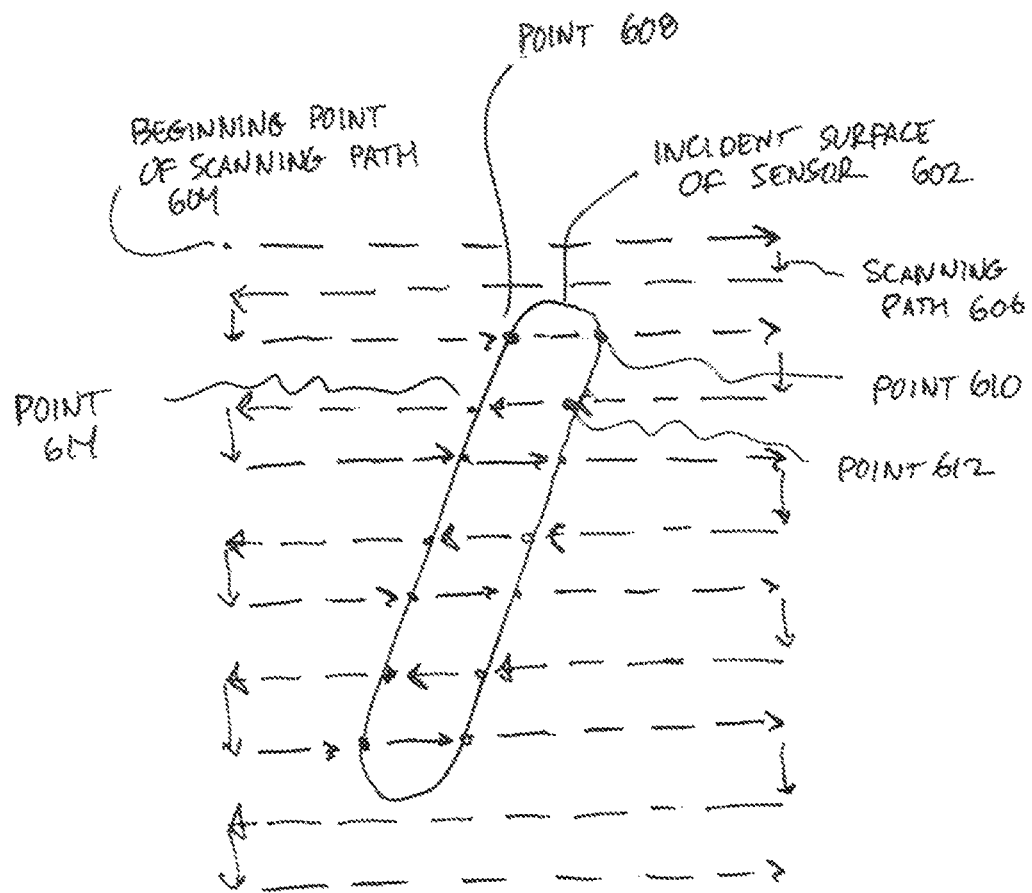
FIG. 6 is a diagram illustration of an embodiment showing scanning by a steerable laser to detect a sensor.

FIG. 6 is a diagram illustration of an example embodiment 600 showing operations of a steerable laser system for scanning to detect a sensor. Embodiment 600 shows a scan path of a laser where the laser may be scanned over its entire operational area and may detect a sensor surface.

An incident surface of a sensor 602 is illustrated. A steerable laser may be mounted such that the operational area of the laser may overlap the sensor. The operational area may be defined by the controllable arcs in which a steerable laser may be directed, such as the steerable laser of embodiment 500.

A scan path 606 may start at one corner of the operational area with a beginning point 604. From the beginning point 604, the laser may traverse one axis, increment along the second axis, and traverse again along the first axis. Such a system may scan across the entire operational area of the laser.

As the scanning takes place, a controller may record when the sensor 602 is detected and when the sensor is not detected. For example, the scanning may occur until point 608 where the sensor is detected. As the scanning continues, the point 610 may be where the sensor 602 is no longer detected. The scanning may continue past points 612 and 614, where the sensor may again be detected then no longer detected. At each transition point, a controller may capture and save the location of the point.

The scanning illustrated by the path 606 may represent a first pass across the operational area of a laser. The first pass may identify multiple transition points. A rough approximation of the incident surface of the sensor 602 may be determined from such a first pass. A calculation may be performed to determine a midpoint or centroid of an area for the sensor 602.

The mechanism of embodiment 600 may illustrate one method by which a controller may automatically identify a sensor and align itself to point towards the sensor. In some cases, the laser may be programmed to point at the center of the Some systems may determine a movement path for a laser, where the laser may scan back and forth from one end of the path to the other. Such a path may be calculated based on the operational area of the sensor.

Figure 7:
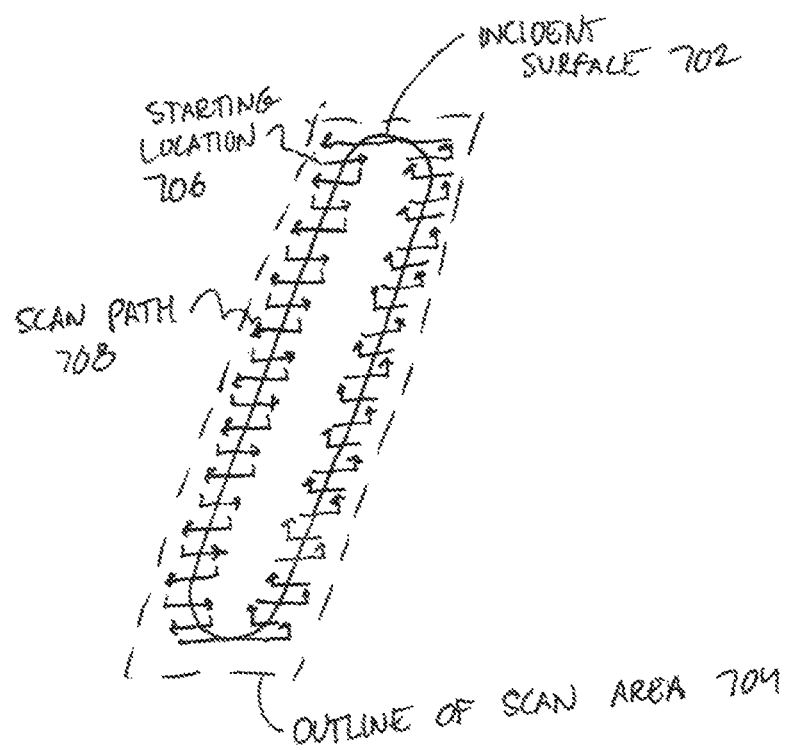
FIG. 7 is a diagram illustration of an embodiment showing a second pass scan of a steerable laser to detect a sensor.

FIG. 7 is a diagram illustration of an example embodiment 700 showing an example method for second pass scanning. The example of embodiment 700 may be a second pass operation that may follow a first pass scan of embodiment 600.

The incident surface of a sensor 702 is shown, similar to that of embodiment 600. From the scan illustrated in embodiment 600, an outline 704 may be identified that is some distance larger than the transition points detected in embodiment 600.

A starting location 706 is selected and the laser may be moved along a scan path 708. In the example of embodiment 700, the laser may scan until it encounters a transition point, then indexes a small distance in a second dimension, and reverses course until another transition point is encountered.

The scan path 708 may follow the edge of an incident surface, all the while collecting more transition points and mapping the incident surface 702. Such a scan method can be compared to the scan path 606 of embodiment 600, which may scan across the entire operational area of the laser. Some systems may use either method, a combination of both methods, or some other method to identify the incident surface 702 of a sensor.

In some embodiments, the sensitivity of the edge detection may be enhanced by lowering the power level of the laser during the second scan illustrated in embodiment 700. A lower power level may heighten the sensitivity of the edge detection by decreasing the effects of scatter and overspray when sensing the laser near the edge of the incident surface 702.

Figure 8:
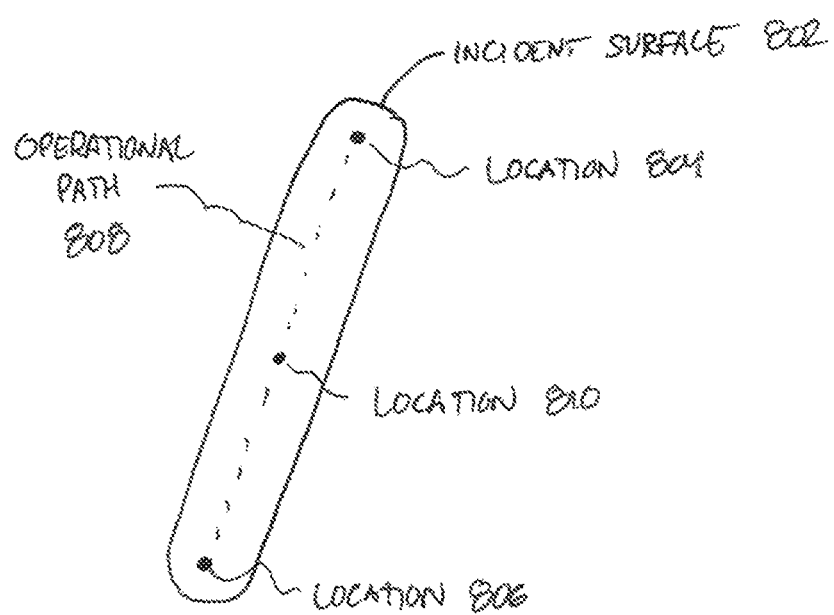
FIG. 8 is a diagram illustration of an embodiment showing calibration points and operational path of a laser sensor.

FIG. 8 is a diagram illustration of an example embodiment 800 showing an incident surface 802 of a sensor and an operational path 808 for a laser. In the example of embodiment 800, a laser may be programmed to scan from location 804 to location 806 and back. Embodiment 800 illustrates an example of an operational path 808 that may be defined by three points. This illustration is merely to simplify the discussion. Other systems may have additional points along an operational path, sometimes with dozens, hundreds, or even thousands of points.

As a laser is moved from location 804 to location 806, a controller may analyze a signal from the laser sensor to determine if the laser beam is broken or not. With some sensors, the signal received at location 804 may be different from the signal received at location 806. For sensors such as the sensor of embodiment 100 that use fluorescent material, the signal received near the photoelectric sensor may be higher than the signal received at a point that is several inches or several feet from the photoelectric sensor. In such embodiments, the signal may be calibrated at multiple locations and a calibration function may be computed.

For example, a laser may be trained at location 804 and a first calibration may be performed. A second calibration may be performed at location 806. From the two calibration operations, a calibration function may be derived so that when the laser is pointed at location 810, an offset or other calibration factor may be computed and applied to the signal.

Figure 9:
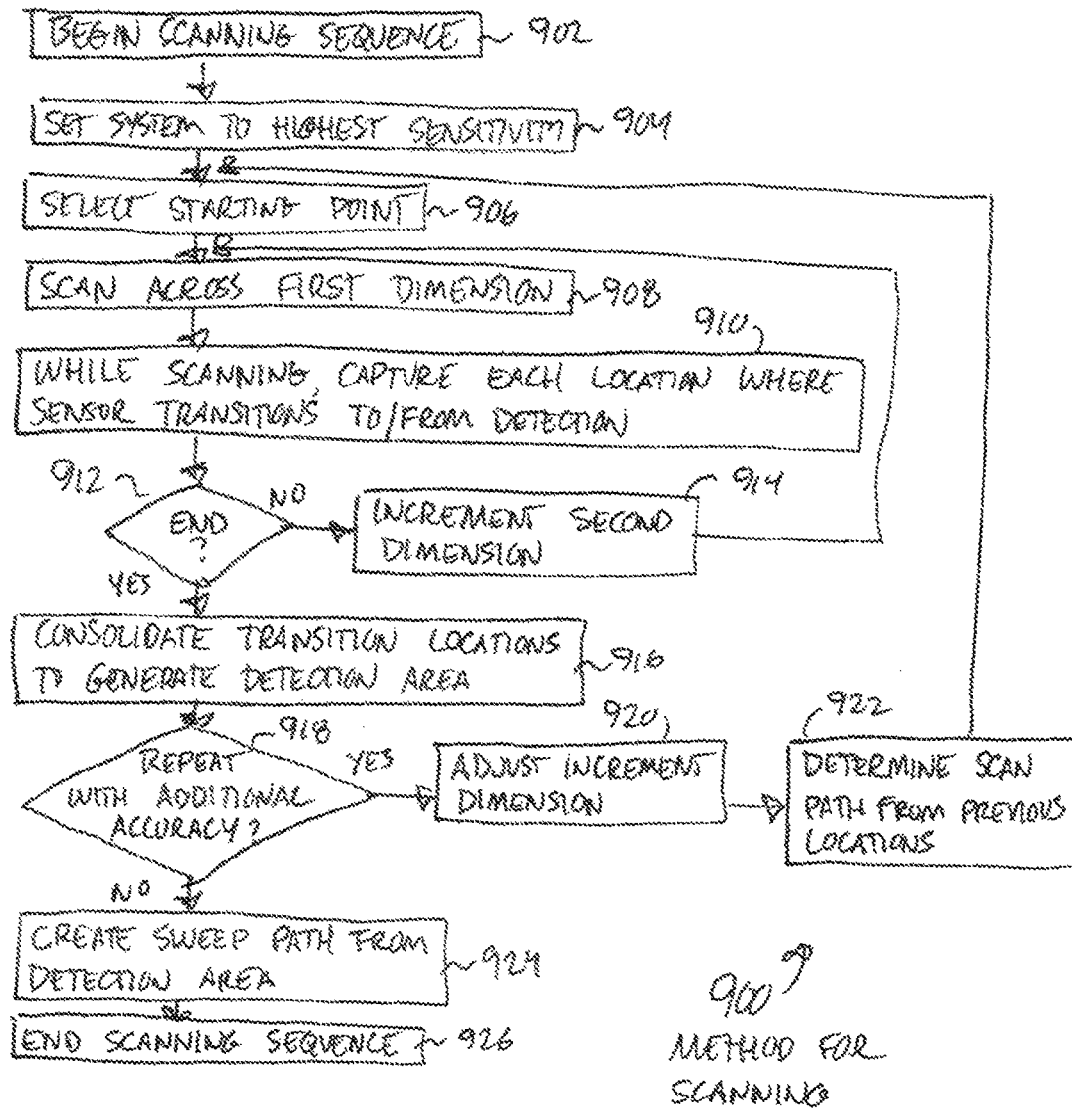
FIG. 9 is a flowchart illustration of an embodiment showing a method for scanning an operational area of a laser to detect a sensor.

FIG. 9 is a flowchart illustration of an embodiment 900 showing a method for scanning the operational area of a steerable laser. The operations of embodiment 900 may also be illustrated in the discussion of embodiments 600 and 700.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 900 illustrates a generalized method for scanning the operational area of a laser and detecting transition points between when a laser is detected and not detected. When a laser may be used in a system with human contact, such as a laser maze game, security system, or other system, the laser may be normally operated such that the laser turns off when the laser beam is not sensed. In the operations of embodiments 600, 700, and 900, such a condition may be overridden such that the laser is kept on even when the laser is not detected. In such cases, the operations of embodiment 900 may be performed automatically when humans may be not present or when humans may have eye protection.

The scanning sequence may begin in block 902. The system may be set to its highest sensitivity and power levels in block 904. A calibration routine may be performed after scanning.

A starting point may be selected in block 906. In many cases, a starting point may be one corner of a rectangular operational area. A scan may be made across a first dimension of the controllable laser's operational area in block 908.

While scanning in block 910, each location where the sensor transitions from detecting or not detecting the laser is captured. If the scan has not fully incremented through the second dimension in block 912, the second dimension is incremented in block 914 and the process may return to block 908 to perform another scan.

After scanning the full operational area in block 912, the transition locations may be consolidated into a detection area in block 914.

If the process is to be repeated for additional accuracy in block 916, the increment dimension may be adjusted to a smaller increment in block 918 and a scan path may be determined in block 920 form the previous transition points. The process may return to block 906 and another scan may be performed.

When the desired accuracy is achieved in block 918, a sweep path may be determined from the detection area in block 924. The sweep path may be a single path or circuit that may be traversed by the laser over the length or path available on a given sensor, such as the examples of embodiment 400 where a linear sensor, circular sensor, and a squiggly path sensor were illustrated. In cases where the sensor is small, the laser may be pointed at a single point at the centroid or center of the detected area.

The scanning sequence may end in block 926.

Figure 10:
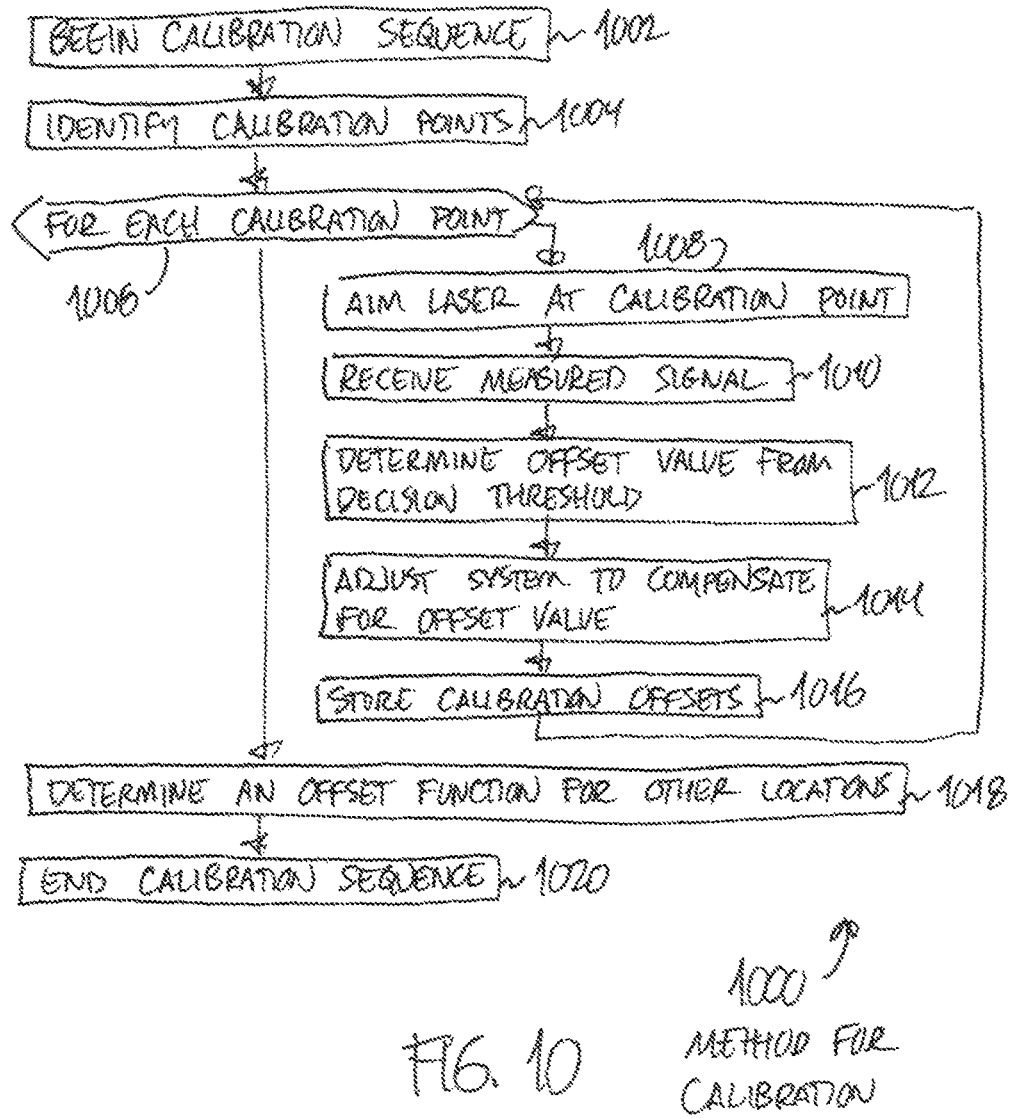
FIG. 10 is a flowchart illustration of an embodiment showing a method for calibrating a laser sensor.

FIG. 10 is a flowchart illustration of an embodiment 1000 showing a method for calibrating a laser system, such as described in embodiment 800. The operations of embodiment 1000 may illustrate one method by which several calibration points may be evaluated and calibration constants or offset values may be calculated. After calibrating the sensor system at two or more points, a calibration function may be determined so that calibration constants may be calculated for other locations in a sensing area.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A calibration sequence may begin in block 1002.

Calibration points may be identified in block 1004. In some cases, the calibration points may be endpoints of a path that a laser may traverse in a scanning laser system. Some cases may use multiple points within a sensor's incident area, such as midpoints or other locations within a scan path.

Each calibration point may be evaluated in block 1006. For each point in block 1008, the laser may be aimed at the point in block 1010. A measured signal may be received in block 1012 indicating that the laser is received.

An offset value may be calculated in block 1014. The offset value may be a difference from the measured signal to a predefined offset from a detection threshold. The detection threshold may be the signal level of a transition from detected to not detected occurs. The predefined offset may be a tolerance or offset that increases the normal signal to compensate for any noise or variation in the signal that can be tolerated while still having the system detect the laser.

The system may be adjusted in block 1016 to compensate for the offset value. The adjustments in block 1016 may be adjusting the energy transmitted by the laser, adjusting the gain applied to the received signal, or a combination of both.

The laser energy level may be adjusted by adjusting the overall power level in some cases. In some cases, the laser energy level may be adjusted by turning the laser on and off. In some such cases, a laser may be turned on and off faster than can be detected by the human eye, such that a human may see a constant beam, but the beam may be cycled on and off. Because the beam may be cycled on and off, the effective power transmitted to the sensor may be reduced, thereby calibrating the received signal to be at the desired offset level.

The calibration offsets may be stored in block 1016.

After analyzing each calibration point in block 1006, a function may be determined in block 1018 from which calibrated offset values may be determined for other locations in the scan area.

The calibration sequence may end in block 1020.

Figure 11:
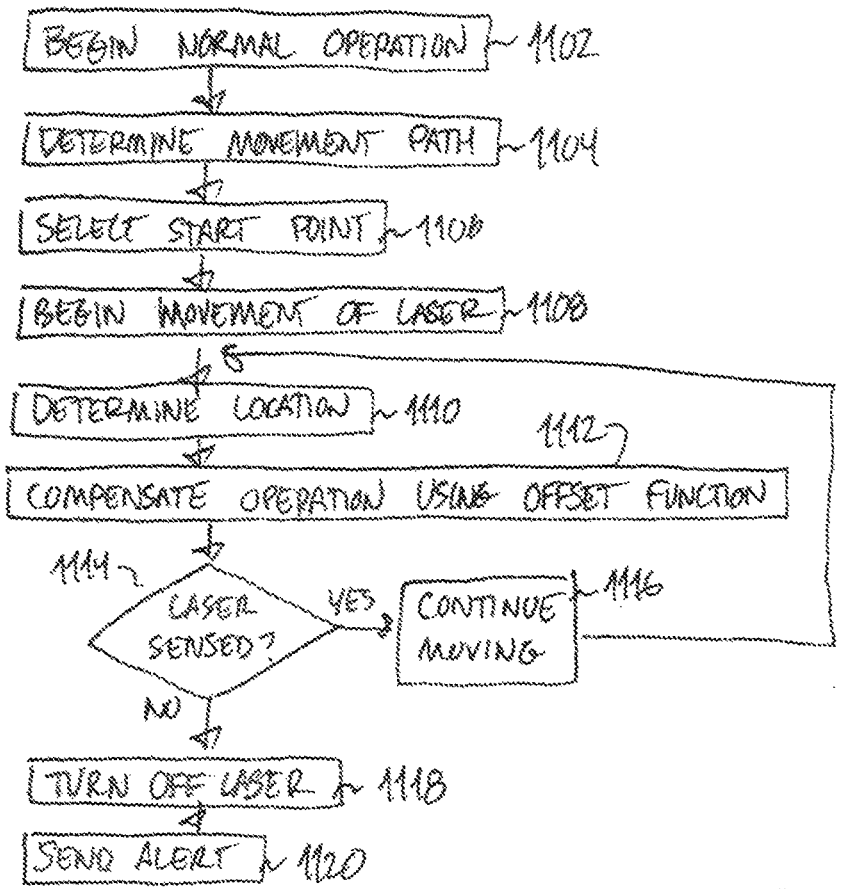
FIG. 11 is a flowchart illustration of an embodiment showing a method for normal or production uses of a laser sensor.

FIG. 11 is a flowchart illustration of an embodiment 1100 showing a method for scanning the operational area of a steerable laser in a normal or production operation. The normal or production uses of a laser sensor may detect the presence or absence of the laser signal by comparing the received signal from a sensor and comparing the signal using an offset determined from a calibration function, such as the calibration function determined in block 1018 of embodiment 1000.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Normal operation may begin in block 1102.

A movement path may be determined in block 1104. The movement path may have been determined after a scanning function. In some cases, the movement path may be programmed into a controller using some other mechanism.

A start point may be selected in block 1106. The movement of the laser across the sensor may begin in block 1108.

As the laser moves, a location may be determined in block 1110. A calibration offset may be calculated in block 1112 and used to calibrate a sensor signal. If the laser is sensed in block 1114, the motion may continue in block 1116 along the path and the method may return to block 1110.

If the laser beam is detected to be broken in block 1114, the laser may be turned off in block 1118 and an alert may be generated or other action taken in block 1120.

Figure 12:
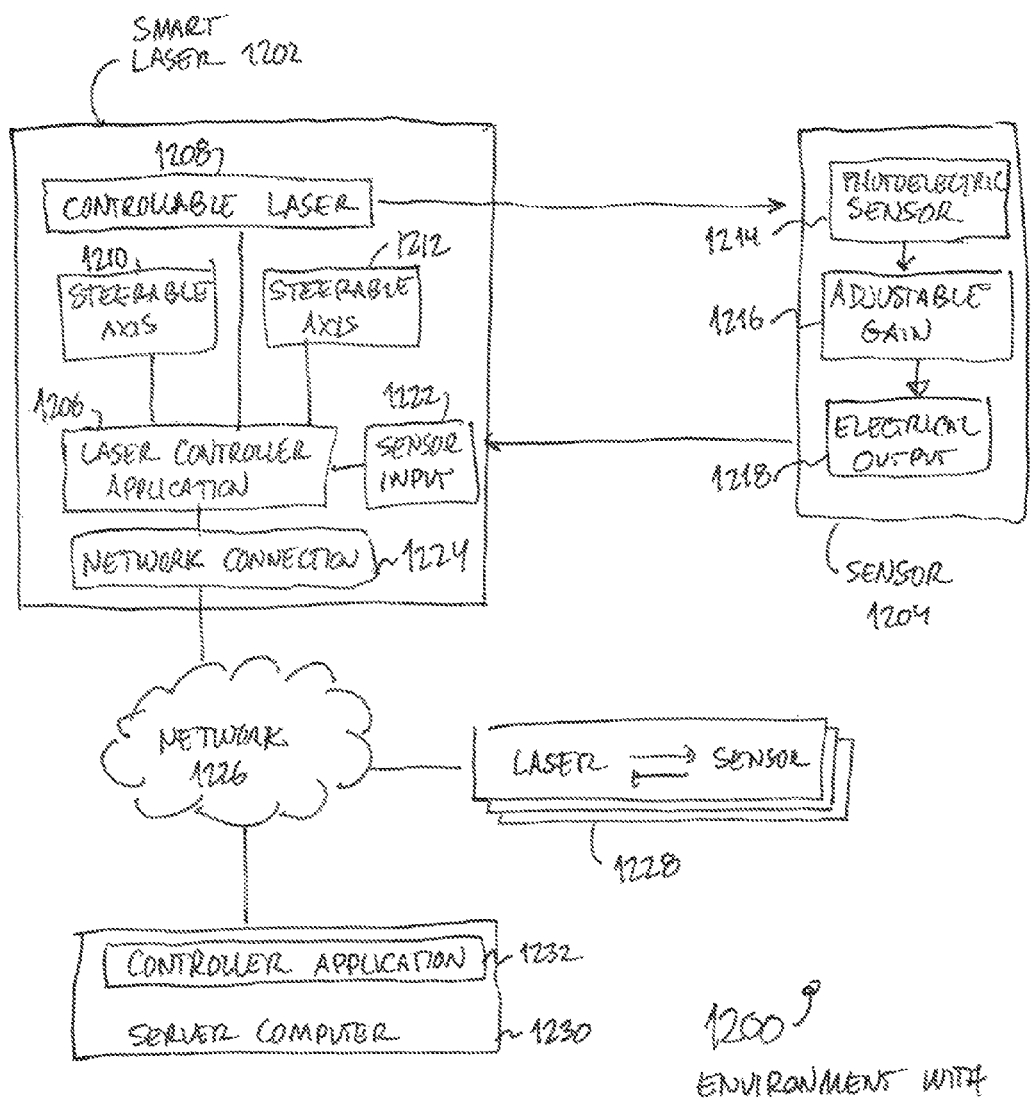
FIG. 12 is a diagram illustration of an embodiment showing an environment with controllable lasers.

FIG. 12 is an example illustration of an embodiment 1200 showing a laser and sensor system in a network architecture. Embodiment 1200 may illustrate many of the same components illustrated in embodiment 200, but with an architecture where the laser and sensors are connected to each other through light transmission and electrical connections. In embodiment 200, the lasers and sensors may be connected through a network. In such an embodiment, the lasers may be programmatically connected to each other by assigning a particular laser to a particular sensor.

Embodiment 1200 may illustrate an architecture where a laser and sensor pair may be matched using hardware or other predetermined mechanism. In some cases, a direct electrical connection may be made between a sensor and a laser controller. In other cases, the electrical connection between a sensor and laser controller may still be made through a network or other connection.

In some applications, a laser controller may be capable of turning off a laser very quickly when the laser beam is not sensed by a sensor. In one example, a laser beam may be deployed to detect human beings may be configured to turn off the laser as quickly as possible when the beam is broken. Such a deployment may turn off the laser beam within a matter of milliseconds from detecting a break in the beam, and may enable a laser system to be classified as a Class II laser system even when the lasers themselves are Class III devices.

Embodiment 1200 shows a smart laser 1202 and a sensor 1204. The smart laser 1202 may include a controller that may control a laser beam directionally as well as may be able to turn the laser on and off, adjust its power level, modulate the laser signal, and perform other operations. The smart laser 1202 may have a programmable controller that may perform many of the various operations, as well as may be connected to a server computer over a network connection.

The smart laser 1202 may be illustrated as a stand alone hardware device, but some embodiments may consist of multiple hardware components that may be connected together.

A laser controller application 1206 may be a processor executing software or other mechanism that may perform functions such as setting up the laser, detecting the sensor, determining and storing an operational path for the laser, causing the laser to move, detecting whether or not the laser is being received by the sensor, communicating with a server computer, and other functions.

The laser controller application 1206 may control the controllable laser 1208, as well as one or more steerable axes 1210 and 1212. The laser controller 1206 may cause the controllable laser 1208 to illuminate and may steer or direct the laser output towards the sensor 1204.

The sensor 1204 may include a photoelectric sensor 1214, which may be connected to a programmable or adjustable gain 1216 and an electrical output 1218. The photoelectric sensor 1214 may be mounted in a sensor such as the sensor illustrated in embodiment 100 or some other sensor mounting.

The electrical output 1218 of the sensor 1204 may be connected to the sensor input 1222 of the laser controller application 1206. In some cases, such a connection may be a direct, hardwired electrical connection, although other cases may pass such a connection through a network or other connection.

When the electrical output 1218 of the sensor 1204 has a direct or other high speed connection with the sensor input 1222, the smart laser 1202 may be capable of detecting changes in light sensed by the photoelectric sensor 1214 in millisecond or sub-millisecond time frames. Such speed may be sufficient to permit the laser controller application 1206 to detect that a laser beam has been broken and to turn off the controllable laser 1208 within the human blink reflex. In such a case, the smart laser 1202 may be classified as a Class II laser system.

The laser controller application 1206 may be connected to a server computer 1230 executing a controller application 1232 through a network 1226 and a network connection 1224. The controller application 1232 may send commands and receive information from the laser controller application 1206 as part of a larger application. For example, a laser maze application may have several smart laser 1202 and sensor 1204 pairs, as illustrated by the laser/sensors 1228.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A sensor device comprising:
   a collector:
   being at least partially translucent;
   having an incident surface that receives a light beam;
   comprising a fluorescent doping that receives said light beam having a first frequency and generates light having a second frequency;
   a sensor mounting surface adjacent to said incident surface;
   a photoelectric sensor having a sensing element, said sensing element being mounted in said sensor mounting surface,
   a diffuser adjacent to said incident surface, said diffuser having an air gap between said diffuser and said incident surface, and said diffuser having at least one frosted surface.

2. The sensor device of claim 1, said second frequency being a visible orange color.

3. The sensor device of claim 2, said first frequency being a visible green color.

4. The sensor device of claim 2, said first frequency being a visible red color.

5. The sensor device of claim 2, said first frequency being a non-visible frequency.

6. The sensor device of claim 1, said incident surface having at least one dimension in excess of 6 inches.

7. The sensor device of claim 1, said incident surface having at least one dimension in excess of 12 inches.

8. The sensor device of claim 1, said incident surface having at least one dimension in excess of 24 inches.

9. The sensor device of claim 1, said incident surface having at least one dimension in excess of 36 inches.

10. The sensor device of claim 1, said incident surface being polished.

11. The sensor device of claim 10, said collector having a second surface parallel to said incident surface, said second surface being polished.

12. The sensor device of claim 1, said photoelectric sensor having a higher detection sensitivity for said second frequency than said first frequency.

13. The sensor device of claim 1 further comprising:
   an escutcheon having an opening, said incident surface being visible to said light beam through said opening.

14. The sensor device of claim 13, said photoelectric sensor being covered at least in part by said escutcheon.

15. The sensor device of claim 1, said light beam being a laser beam.

16. The sensor device of claim 1 further comprising a light filter.

17. A sensor device comprising:
   a collector:
   being at least partially translucent;
   having an incident surface that receives a light beam;
   comprising a fluorescent doping that receives said light beam having a first frequency and generates light having a second frequency;
   a sensor mounting surface adjacent to said incident surface;
   a photoelectric sensor having a sensing element, said sensing element being mounted in said sensor mounting surface,
   said sensor mounting surface being perpendicular to said incident surface and said photoelectric sensor being mounted with an air gap between said photoelectric sensor and said sensor mounting surface.

* * * * *